United States Patent
Li

(10) Patent No.: US 10,666,758 B2
(45) Date of Patent: May 26, 2020

(54) BROWSER RESOURCE PRE-PULLING METHOD, TERMINAL AND STORAGE MEDIUM

(71) Applicant: TENCENT TECHNOLOGY (SHENZHEN) COMPANY LIMITED, Shenzhen (CN)

(72) Inventor: Zhun Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 13 days.

(21) Appl. No.: 16/214,002

(22) Filed: Dec. 7, 2018

(65) Prior Publication Data

US 2019/0109920 A1 Apr. 11, 2019

Related U.S. Application Data

(63) Continuation of application No. PCT/CN2017/095275, filed on Jul. 31, 2017.

(30) Foreign Application Priority Data

Sep. 23, 2016 (CN) .......................... 2016 1 0848783

(51) Int. Cl.
  *H04L 29/08* (2006.01)
  *G06F 16/00* (2019.01)
  *G06F 16/957* (2019.01)

(52) U.S. Cl.
  CPC .......... *H04L 67/2847* (2013.01); *G06F 16/00* (2019.01); *G06F 16/9574* (2019.01);
  (Continued)

(58) Field of Classification Search
  CPC ..... H04L 67/2847; H04L 67/02; H04L 67/22; H04L 67/306; G06F 16/9574; G06F 16/00
  (Continued)

(56) References Cited

U.S. PATENT DOCUMENTS

2016/0283461 A1  9/2016 Guo et al.
2018/0052943 A1* 2/2018 Hui .................... G06F 16/9577

FOREIGN PATENT DOCUMENTS

CN  102722559 A  10/2012
CN  102880616 A   1/2013
(Continued)

OTHER PUBLICATIONS

International Search Report & Written Opinion dated Nov. 9, 2017 in PCT/CN2017/095275, filed Jul. 31, 2017 (w/ English translation of Category of Cited Documents) 9 pp.

*Primary Examiner* — Glenford J Madamba
(74) *Attorney, Agent, or Firm* — Oblon, McClelland, Maier & Neustadt, L.L.P.

(57) ABSTRACT

A method and a terminal device for browser resource pre-pulling are provided. A page address list is obtained by processing circuitry of a terminal device that browses webpage via a network. The page address list is obtained from a present webpage in a browser of the terminal device. The page address list includes page addresses of webpages that are linked in the present webpage, and with respective access frequencies satisfying a preset condition. The processing circuitry further determines whether the network is idle. The processing circuitry performs a first page pre-rendering when the network is idle. The first page pre-rendering is to download, via interface circuitry of the terminal device and the network, first page resource of a first webpage according to the first page address, render the first
(Continued)

webpage using the first page resource, and store the rendered first webpage in a cache.

16 Claims, 3 Drawing Sheets

(52) U.S. Cl.
CPC .............. *H04L 67/02* (2013.01); *H04L 67/22* (2013.01); *H04L 67/306* (2013.01)

(58) Field of Classification Search
USPC ........................................................ 709/219
See application file for complete search history.

(56) References Cited

FOREIGN PATENT DOCUMENTS

| | | |
|---|---|---|
| CN | 103123630 A | 5/2013 |
| CN | 104063460 A | 9/2014 |
| WO | 2015-127882 A1 | 9/2015 |

\* cited by examiner

BROWSER RESOURCE PRE-PULLING METHOD, TERMINAL AND STORAGE MEDIUM

RELATED APPLICATION

This application is a continuation of International Application No. PCT/CN2017/095275 filed on Jul. 31, 2017, which claims priority to Chinese Patent Application No. 201610848783.8, entitled "BROWSER RESOURCE PRE-PULLING METHOD AND APPARATUS" filed on Sep. 23, 2016. The entire disclosures of the prior applications are hereby incorporated by reference in their entirety.

FIELD OF THE TECHNOLOGY

This application relates to the field of network technologies.

BACKGROUND OF THE DISCLOSURE

A browser is used for displaying text, images, and other information on the World Wide Web or a local area network. When the browser loads the information, to improve a page (or webpage) loading speed, resources usually are pulled by using a resource pre-pulling technology.

The resource pre-pulling technology is a technology of performing resource pulling in advance according to resources required for multiple times of page (or webpage) rendering. In a conventional resource pre-pulling method, first, hit ratios of pulled files need to be calculated, and then several files having a highest hit ratio are selected and recorded. The files having high hit ratios are pulled in advance when a page is accessed next time. The hit ratio is a probability that pre-rendering has been performed on a requested webpage when access to the page is requested.

Consequently, in the conventional resource pre-pulling method, an operation amount is large, and a page loading speed is slow.

SUMMARY

Embodiments of this application provide a method for browser resource pre-pulling, a terminal device that is associated with the method for browser resource pre-pulling, and a non-transitory computer-readable storage medium storing a program executable by a processor to perform the method for browser resource pre-pulling.

In an embodiment, a method for browser resource pre-pulling is provided. A page address list is obtained by processing circuitry of a terminal device that browses webpages via a network. The page address list is obtained from a present webpage in a browser of the terminal device. The page address list includes page addresses of webpages that are linked in the present webpage, and with respective access frequencies satisfying a preset condition. The processing circuitry of the terminal device further determines whether the network is idle. The processing circuitry performs a first page pre-rendering when the network is idle. The first page pre-rendering is to download, via interface circuitry of the terminal device and the network, first page resource of a first webpage according to the first page address, render the first webpage using the first page resource, and store the rendered first webpage in a cache.

In an embodiment, a second page address is obtained from the page address list. A second page pre-rendering is performed by the processing circuitry, when the network is idle. The second page pre-rendering is configured to download, via the interface circuitry and the network, second page resource of a second webpage according to the second page address, render the second webpage using the second page resource, and store the second webpage in the cache.

In an embodiment, the network is determined to be idle when an idle metrication is received form the interface circuitry. The idle notification is obtained from the interface circuitry when the present webpage has been rendered in the browser.

In an embodiment, the idle notification is obtained from the interface circuitry after a completion of the first page pre-rendering.

In an embodiment, the method can include obtaining the page address list of the webpages with the access frequencies being higher than a preset value or obtaining a preset number of most accessed webpages in the page address list.

In an embodiment, an idle waiting instruction is sent from the processing circuitry to the interface circuitry. The idle notification is generated by the interface circuitry and in response to the idle waiting instruction when the network is idle.

In an embodiment, the page address list is obtained from the present webpage in the browser of the terminal device after a rendering of the present webpage in the browser is completed.

In the disclosed method, the process circuitry of the terminal device further determine whether the first webpage corresponding to the first page address exists in the cache, and perform the first page pre-rendering when the first webpage is missing in the cache and the network is idle.

In another embodiment, a terminal device is provided. The terminal device includes interface circuitry, and processing circuitry. The interface circuitry receives and transmits message between the terminal device and the network. The processing circuitry obtains a page address list from a present webpage in a browser of the terminal device that browses webpages via the network. The page address list includes page addresses of webpages that are linked in the present webpage, and with respective access frequencies satisfying a preset condition. The processing circuitry is further configured to determine that the network is idle and obtain a first page address from the page address list. The processing circuitry is further configured to perform a first page pre-rendering when the network is idle. The first page pre-rendering is to download, via the interface circuitry of the terminal device, first page resource of a first webpage according to the first page address, render the first webpage using the first page resource, and store the rendered first webpage in a cache.

In yet another embodiment of the present disclosure, a non-transitory computer-readable storage medium is provided. The non-transitory computer-readable storage medium stores a program executable by a processor to obtain a page address list from a present webpage in a browser that browses webpages via a network. The page address list includes page addresses of webpages that are linked in the present webpage, and with respective access frequencies satisfying a preset condition. Next, a first page address from the page address list is obtained when the network is determined to be idle. A first page pre-rendering is performed subsequently when the network is ide to download first page resource of a first webpage according to the first page address, render the first webpage using the first page resource, and store the rendered first webpage in a cache.

Details of one or more embodiments of this application are provided in the following accompanying drawings and descriptions. Other features, objectives, and advantages of this application become more obvious with reference to the specification, the accompanying drawings, and the claims.

BRIEF DESCRIPTION OF THE DRAWINGS

To describe the technical solutions in the embodiments of this application more clearly, the following briefly describes the accompanying drawings required for describing the embodiments. The accompanying drawings in the following description show merely some embodiments of this application, and a person of ordinary skill in the art may still derive other drawings from these accompanying drawings.

DESCRIPTION OF EMBODIMENTS

To make the objectives, technical solutions, and advantages of this application clearer and more comprehensible, the following further describes this application in detail with reference to the accompanying drawings and embodiments. It should be understood that the specific embodiments described herein are merely used for explaining this application but are not intended to limit the protection scope of this application.

Figure 1:
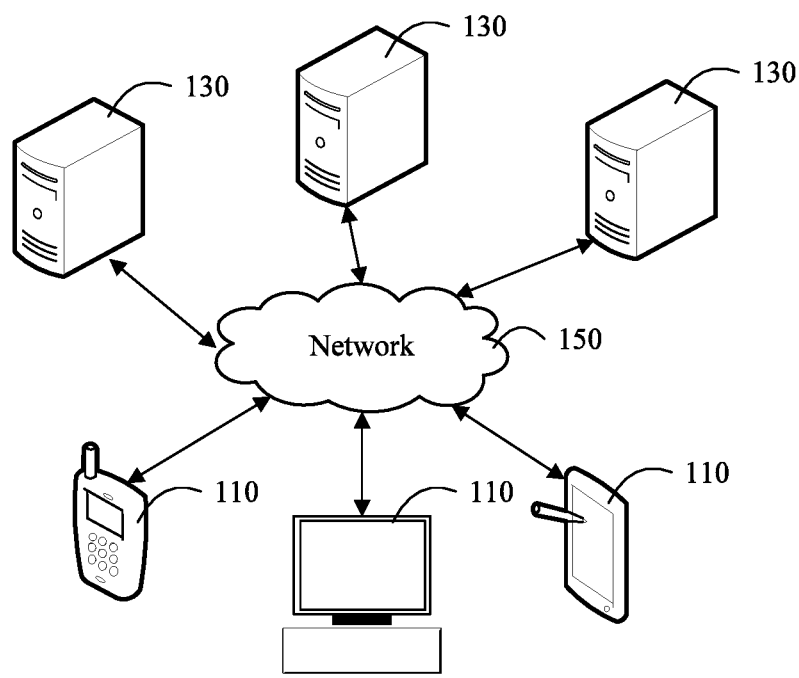
FIG. 1 is a schematic diagram of a working environment according to an embodiment of this application.

The present disclosure is related to a method to improve a page (or webpage) loading speed in the field of network technologies. FIG. 1 is a schematic diagram of a working environment according to an embodiment of this application. As shown in FIG. 1, the working environment includes a terminal 110, a server 130, and a network 150. The terminal 110 and the server 130 may communicate with each other through the network 150. The terminal 110 accesses, according to a page address and through the network 150, the server 130 corresponding to the page address, to request a corresponding page resource. The terminal 110 may be any device that can implement intelligent input/output, such as a desktop computer or a mobile terminal. The mobile terminal may be a smartphone, a tablet computer, an in-vehicle computer, a wearable intelligent device, or the like. The server 130 is a server on which a platform that provides the page resource corresponding to the page address is located, and there may be multiple servers 130.

Figure 2:
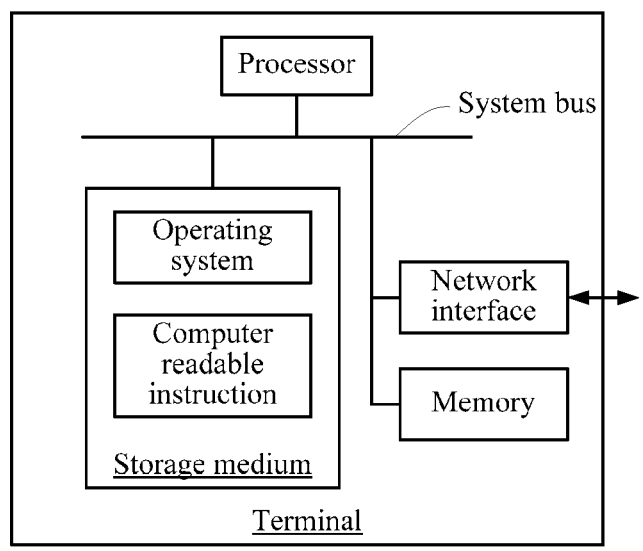
FIG. 2 is a schematic diagram of an internal structure of a terminal (or terminal device) in FIG. 1.

A schematic diagram of an internal structure of the terminal 110 in an embodiment is shown in FIG. 2. The terminal 110 includes a processor, a storage medium, a network interface, and a memory that are connected by a system bus. The storage medium of the terminal 110 is a non-volatile storage medium and stores an operating system and a computer readable instruction. When the computer readable instruction is executed by the processor, the processor may be caused to implement a browser resource pre-pulling method. The processor is configured to provide computing and control capabilities to support running of the entire terminal. The memory provides a high speed cache operating environment for the operating system and the computer executable instruction in the non-volatile storage medium. The network interface is configured to connect to and communicate with the network 150. A person skilled in the art may understand that the structure shown in FIG. 2 is merely a block diagram of a partial structure related to a solution in this application is shown, and does not constitute a limitation to the terminal 110 to which the solution in this application is applied. For example, the terminal 110 may include more components or fewer components than those shown in the figure, or some components may be combined, or a different component deployment may be used.

Figure 3:
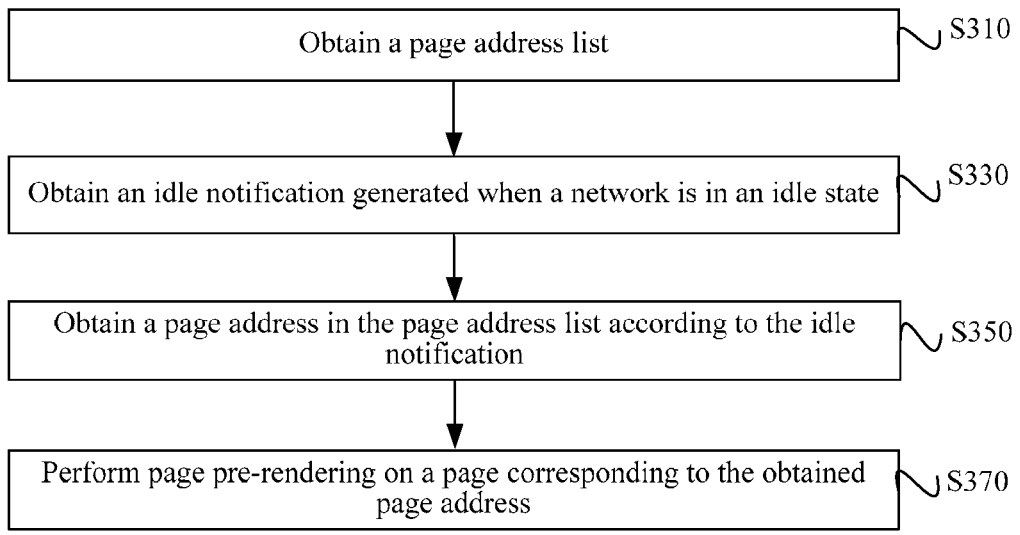
FIG. 3 is a flowchart of a browser resource pre-pulling method according to an embodiment.

As shown in FIG. 3, an embodiment of this application provides a browser resource pre-pulling method, including the following steps:

Step S310: Obtain a page address list, the page address list including a page address of a page whose access frequency satisfies a preset condition.

The preset condition may be that the access frequency is greater than a preset value, or that the access frequency is within the first preset positions in access frequencies of all historical access webpages. The first preset positions may be the first 10 positions, or the first 8 positions. In this way, the page address list of pages frequently accessed by a user is obtained.

Step S330: Obtain an idle notification generated when a network is in an idle state.

The idle notification generated when the browser network is in an idle state is obtained. The idle notification is a notification indicating that the browser network is idle. The network being in an idle state means that the browser is in a state in which the browser does not need to obtain a network resource or upload a resource. It should be noted that, a status of the network includes an idle state and a working state. The working state is a state in which the browser obtains a network resource or uploads a resource.

Step S350: Obtain a page address in the page address list according to the idle notification.

After the idle notification is obtained, the page address in the page address list is obtained, so that page pre-rendering is performed on a page corresponding to the address. If the idle notification is not obtained, no processing is performed. For example, after the idle notification is obtained, a preset quantity of page addresses in the page address list are obtained, so that page pre-rendering is performed on pages corresponding to the addresses. The preset quantity may be a total quantity of the page addresses in the page address list, or may be any quantity such as three, or two. In an example, the preset quantity is one. In this case, one page is pre-rendered each time, so that an impact caused by excessively many pre-rendered pages to a timely response made by a browser to a current loading request is avoided.

Step S370: Perform page pre-rendering on a page corresponding to the obtained page address.

After the page address is obtained, page pre-rendering is performed on the page corresponding to the obtained page address. In this way, resource pre-pulling is implemented.

In the browser resource pre-pulling method, the page address list of the frequently accessed pages is obtained directly, a page of a pre-pulled resource does not need to be calculated and determined, and page pre-rendering is performed when the network is idle, so that resource pre-pulling is implemented. In this case, when the page on which page pre-rendering is completed needs to be loaded, related resources do not need to be pulled, or only a small quantity of resources that are updated after pre-rendering or that cannot be pulled during pre-pulling need to be pulled, so that a page loading speed can be increased.

In an embodiment, after page pre-rendering is performed on the page corresponding to the obtained page address, the step of obtaining an idle notification generated when a network is in an idle state may further be performed again, until all page addresses in the page address list are obtained. That is, after step S370 is performed, step S330 is performed again, until all page addresses in the page address list are obtained. In an embodiment, the step of obtaining a page address from the page address list according to the idle notification may be: extracting the page address from the page address list according to the idle notification. Further, after page pre-rendering is performed on the page corresponding to the extracted page address, the step of obtaining an idle notification generated when a network is in an idle state may further be performed again, until all page addresses in the page address list are extracted. That is, the step of obtaining an idle notification generated when a network is in an idle state includes: extracting the page address from the page address list according to the idle notification; the performing again the step of obtaining an idle notification generated when a network is in an idle state is performed again, until all page addresses in the page address list are obtained includes: performing the step of extracting the page address from the page address list according to the idle notification, until all page addresses in the page address list are extracted.

In this case, page pre-rendering is performed on pages corresponding to all page addresses in the page address list, to implement resource pre-pulling for the pages corresponding to all page addresses in the page address list, so that the page loading speed can further be increased.

In an embodiment, the step of obtaining an idle notification generated when a network is in an idle state, that is, step S330 includes:

obtaining the idle notification generated when the network is in an idle state, after page rendering on the first page that occurs after a browser is opened is completed, or after page pre-rendering on a subsequent page of the first page is completed.

When the browser opens the first page or the subsequent page of the first page and performs page rendering or page pre-rendering, a large quantity of resources need to be consumed, and the browser is in a busy state, that is, a working state. Therefore, the idle notification generated when the network is in an idle state is obtained after page rendering on the first page that occurs after the browser is opened is completed, or after page pre-rendering on the subsequent page of the first page is completed. In this way, an impact caused by resource pre-pulling to the current working efficiency of the browser is avoided.

In an embodiment, after page rendering on the first page that occurs after the browser is opened is completed, the page address list is obtained.

When the browser opens the first page and performs page rendering, a large quantity of resources need to be consumed, and the browser is in a busy state. Therefore, in this embodiment, the page address list is obtained after the first page is opened and page rendering on the first page is completed. In this way, an impact caused by the obtaining of the page address list to the current working efficiency of the browser is avoided.

For ease of description, a structure of the browser is described. The browser includes:

a page displaying module (Browser): responsible for browser interface displaying and page management;

a rendering module (Render): responsible for a rendering work of the page and returning a rendering result of the page to the browser for displaying;

a history recording module (History): a module for recording historical browsing information in the browser, and capable of providing a list of several frequently accessed page addresses;

a network accessing module (Net): responsible for downloading, from a network, various resources required by the browser;

a resource cache module (HttpCache): providing resource cache (or cache) for browser, to increase a browsing speed. When needing a resource, the browser first searches for the resource in the resource cache, and if the resource exists in the resource cache, the browser uses the resource, or if the resource does not exist in the resource cache, the browser downloads the resource by using the Net, and after the resource is downloaded successfully, stores the resource into the resource cache and uses the resource; and a pre-rendering module (Prerender): a module responsible for page pre-rendering in the browser. The browser renders a page in an invisible tab, and the tab includes all child resources thereof. When a user needs to browse the page, the tab is switched to the front, to implement quick loading of the page. A resource downloaded during pre-rendering is stored into the HttpCache.

Figure 4:
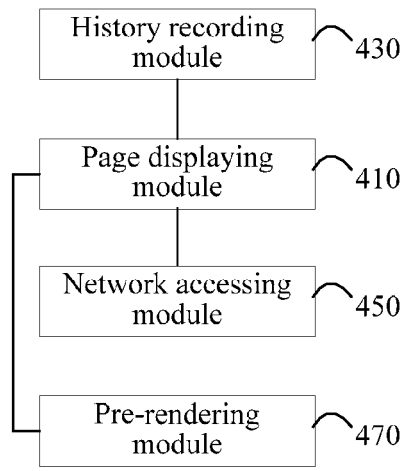
FIG. 4 is a structural block diagram of a terminal according to an embodiment.

As shown in FIG. 4, an embodiment of this application provides a terminal corresponding to the foregoing browser resource pre-pulling method. An internal structure of the terminal may correspond to the structure shown in FIG. 2. All or some of the modules described below may be implemented by software, hardware, or a combination thereof. The terminal includes: a page displaying module 410, a history recording module 430, a network accessing module 450, and a pre-rendering module 470.

The history recording module 430 is configured to obtain and send a page address list to the page displaying module 410. The page address list includes a page address of a page whose access frequency satisfies a preset condition.

The preset condition may be that the access frequency is greater than a preset value, or that the access frequency is within the first preset positions in access frequencies of all historical access webpages. In this way, the history recording module 430 obtains the page address list of pages frequently accessed by a user. After obtaining the page address list, the history recording module 430 sends the page address list to the page displaying module 410.

The network accessing module 450 is configured to send an idle notification to the page displaying module 410 when a network is in an idle state.

The network accessing module 450 generates the idle notification when the network is in an idle state, and sends the idle notification to the page displaying module 410. The idle notification is a notification indicating that a browser network is idle. That the network is in an idle state means that a browser does not need to obtain a network resource or upload a resource.

The page displaying module 410 is configured to obtain a page address in the page address list according to the idle notification, and send the obtained page address to the pre-rendering module 470.

After obtaining the idle notification, the page displaying module 410 obtains the page address in the page address list, so that page pre-rendering is performed on a page corresponding to the address. For example, after the idle notification is obtained, a preset quantity of page addresses in the page address list are obtained, so that page pre-rendering is performed on pages corresponding to the addresses. The preset quantity may be a total quantity of the page addresses in the page address list, or may be any quantity such as three, or two. In an example, the preset quantity is one. In this case, one page is pre-rendered each time, so that an impact caused by excessively many pre-rendered pages to a timely response made by the browser to a current loading request is avoided.

The pre-rendering module 470 is configured to receive the page address, and perform page pre-rendering on a page corresponding to the received page address.

The pre-rendering module 470 receives the page address sent by the page displaying module 410, and performs page pre-rendering on the page corresponding to the received page address. In this way, resource pre-pulling is implemented.

The terminal directly obtains the page address list of the frequently accessed pages, does not need to calculate and determine a page of a pre-pulled resource, and performs page pre-rendering when the network is idle, so that resource pre-pulling is implemented. In this case, when the page on which page pre-rendering is completed need to be loaded, related resources do not need to be pulled, or only a small quantity of resources that are updated after pre-rendering or that cannot be pulled during pre-pulling need to be pulled, so that a page loading speed can be increased.

In an embodiment, the page displaying module 410 is further configured to send an address list request to the history recording module 430.

The address list request includes information about the page address list. For example, the address list request may be generated when the page displaying module 410 is idle, and sent to the history recording module 430.

The history recording module 430 is configured to obtain and send the page address list to the page displaying module 410 according to the address list request.

After receiving the address list request sent by the page displaying module 410, the history recording module 430 obtains and sends the page address list to the page displaying module 410 according to the address list request.

Figure 5:
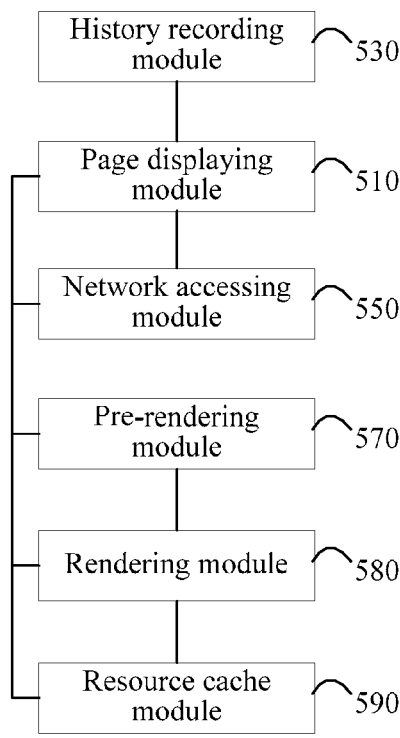
FIG. 5 is a structural block diagram of a terminal according to another embodiment.

Referring to FIG. 5, in an embodiment, the terminal further includes a rendering module 580.

The rendering module 580 is configured to: after page rendering on the first page that occurs after a browser is opened is completed, send, to the page displaying module 510, a notification indicating that page rendering on the first page is completed.

The pre-rendering module 570 is further configured to: after page pre-rendering on a subsequent page of the first page is completed, send, to the page displaying module 510, a notification indicating that page pre-rendering on the subsequent page is completed.

The page displaying module 510 is configured to send an idle wait instruction to the network accessing module 550 according to the notification indicating that page rendering on the first page is completed or the notification indicating that page pre-rendering on the subsequent page is completed.

The network accessing module 550 is configured to send an idle notification to the page displaying module 510 according to the idle wait instruction when the network is in an idle state.

When the browser opens the first page or the subsequent page of the first page and performs page rendering or page pre-rendering, a large quantity of resources need to be consumed, and the browser is in a busy state. Therefore, the page displaying module 510 may receive the notification that indicates that page rendering on the first page is completed and that is sent by the rendering module 580 after the first page is opened and page rendering on the first page is completed, or the page displaying module 510 receives the notification that indicates that page pre-rendering on the subsequent page is completed and that is sent by the pre-rendering module 570 after page pre-rendering on the subsequent page is completed. Moreover, the page displaying module 510 sends the idle wait instruction to the network accessing module 550 according to the notification indicating that page rendering on the first page is completed or the notification indicating that page pre-rendering on the subsequent page is completed, and then receives the idle notification that is sent by the network accessing module 550 according to the idle wait instruction when the network is in an idle state. In this way, an impact caused by resource pre-pulling on the current working efficiency of the browser is avoided.

Still referring to FIG. 5, in an embodiment, the terminal further includes a rendering module 580.

The rendering module 580 is configured to: after page rendering on the first page that occurs after a browser is opened is completed, send, to the page displaying module 510, a notification indicating that page rendering on the first page is completed.

The page displaying module 510 is configured to send the address list request to the history recording module 530 after the notification that indicates that page rendering on the first page that occurs after the browser is opened is completed and that is sent by the rendering module 580 after page rendering on the first page is completed is received.

When the browser opens the first page and performs page rendering by using the rendering module 580, a large quantity of resources need to be consumed, and the browser is in a busy state. Therefore, in this embodiment, after the first page is opened and page rendering on the first page is completed, the address list request is sent to the history recording module 530, so that the history recording module 530 obtains the page address list and sends the page address list to the page displaying module 510. In this way, an impact caused to the current working efficiency of the browser because the history recording module 530 of the browser obtains the page address list when page pre-rendering is performed on the first page.

In an embodiment, the network accessing module 550 is configured to send an idle notification to the page displaying module 510 when not all page addresses in the page address list are obtained and the network is in an idle state.

When not all page addresses in the page address list are obtained, it indicates that a page address on which page pre-rendering is not performed exists in the page address list. The idle notification needs to be obtained again, the page address needs to be obtained, and page pre-rendering needs to be performed on a page. Therefore, the network accessing module 550 sends the idle notification to the page displaying module 510 when not all page addresses in the page address list are obtained and the network is in an idle state. In this case, page pre-rendering is performed on pages corresponding to all page addresses in the page address list, to implement resource pre-pulling for the pages corresponding to all page addresses in the page address list, so that a page loading speed can further be improved.

Still referring to FIG. 5, in an embodiment, the terminal further includes a rendering module 580 and a resource cache module 590.

The pre-rendering module 570 is configured to receive a page address sent by the page displaying module 510, and send a pre-rendering instruction to the rendering module 580 according to the received page address. The pre-rendering instruction includes the received page address.

The rendering module 580 is configured to: according to the pre-rendering instruction, when a page resource needs to be loaded for a page corresponding to the page address included in the pre-rendering instruction, send a resource request to the resource cache module 590 according to a resource identifier of the page resource needing to be loaded. The resource request includes the resource identifier. The resource identifier is an identity of the resource, and different resources may be distinguished by using resource identifiers.

The resource cache module 590 is configured to determine, according to the resource request, whether the page resource corresponding to the resource identifier is in a resource cache, and if the page resource is not in the resource cache, send a download request to the network accessing module 550. The download request includes the resource identifier.

The network accessing module 550 is further configured to download the page resource corresponding to the resource identifier according to the download request.

In another embodiment, the network accessing module 550 is further configured to: after the page resource corresponding to the resource identifier is successfully downloaded, return the downloaded page resource corresponding to the resource identifier to the resource cache module 590.

The resource cache module 590 is further configured to return the page resource that corresponds to the resource identifier and that is returned by the network accessing module 550 to the rendering module 580, and store page resource into the resource cache.

The rendering module 580 is further configured to return a rendering result to the pre-rendering module 570 according to the page resource that corresponds to the resource identifier and that is returned by the rendering module 580.

The pre-rendering module 570 is further configured to return a pre-rendering result to the page displaying module 510 according to the rendering result.

In an embodiment, the resource cache module 590 is further configured to determine, according to the resource request, whether the page resource is in the resource cache, and if the page resource is in the resource cache, return the page resource to the rendering module 580.

Figure 6:
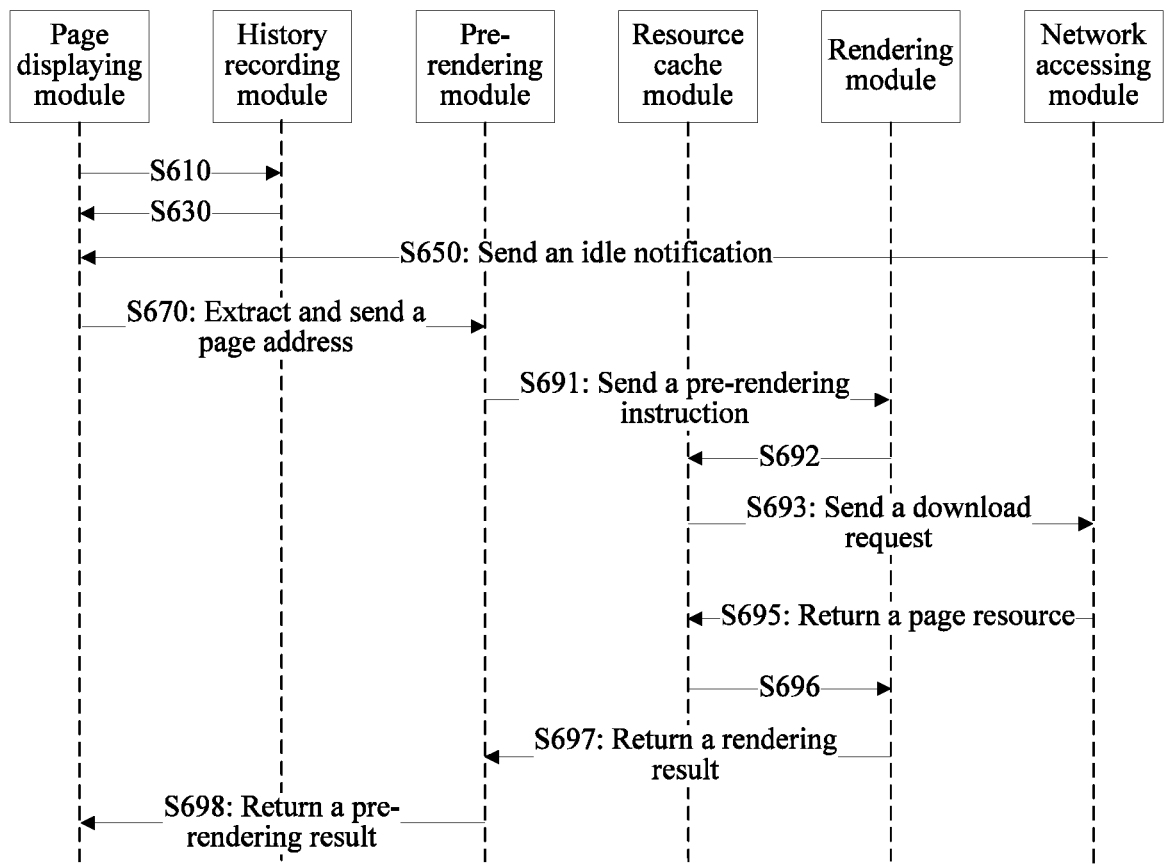
FIG. 6 is a working sequence diagram of the terminal in FIG. 5.

Referring to FIG. 6, in a specific embodiment, a working sequence of the terminal includes:

Step S610: The page displaying module 510 sends an address list request to the history recording module 530.

Step S630: The history recording module 530 returns a page address list to the page displaying module 510 according to the address list request.

Step S650: The network accessing module 550 sends an idle notification to the page displaying module 510 when a network is in an idle state.

Step S670: The page displaying module 510 obtains a page address in the page address list according to the idle notification, and sends the obtained page address to the pre-rendering module 570.

Step S690, the pre-rendering module 570 receives the page address, and performs page pre-rendering on a page corresponding to the received page address.

The step S690 that the pre-rendering module 570 receives the page address, and performs page pre-rendering on a page corresponding to the received page address includes:

Step S691: The pre-rendering module 570 receives the page address sent by the page displaying module 510, and sends a pre-rendering instruction to the rendering module 580 according to the received page address.

Step S692: According to the pre-rendering instruction, when a page resource needs to be loaded for the page corresponding to the page address included in the pre-rendering instruction, the rendering module 580 sends a resource request to the resource cache module 590 according to a resource identifier of the page resource needing to be loaded.

Step S693: The resource cache module 590 determines, according to the resource request, whether the page resource corresponding to the resource identifier is in a resource cache, and if the page resource is not in the resource cache, sends a download request to the network accessing module 550.

Step S695: The network accessing module 550 downloads the page resource corresponding to the resource identifier according to the download request, and after the page resource corresponding to the resource identifier is successfully downloaded, returns the downloaded page resource corresponding to the resource identifier to the resource cache module 590.

Step S696: The resource cache module 590 returns, to the rendering module 580, the page resource that corresponds to the resource identifier and that is returned by the network accessing module 550, and stores the page resource into the resource cache.

Step S697: The rendering module 580 returns a rendering result to the pre-rendering module 570 according to the page resource that corresponds to the resource identifier and that is returned by the rendering module 580.

Step S698: The pre-rendering module 570 returns a pre-rendering result to the page displaying module according to the rendering result.

A person of ordinary skill in the art may understand that all or some of the processes in the methods of the foregoing embodiments may be implemented by a computer program instructing relevant hardware. The program may be stored in a non-volatile computer readable storage medium. For example, in the embodiments of this application, the program may be stored in a storage medium of a computer system, and is executed by at least one processor in the computer system, to implement the process including the foregoing method embodiments. The foregoing storage medium may be a magnetic disk, an optical disc, a read-only memory (ROM), a random access memory (RAM), or the like.

Various technical features in the foregoing embodiments may be combined randomly. For ease of description, not all possible combinations of various technical features in the foregoing embodiments are described. However, the combinations of the technical features should be considered as falling within the scope recorded in this specification provided that the combinations of the technical features are compatible with each other.

The foregoing embodiments only describe several implementations of this application, which are exemplary, and therefore cannot be construed as a limitation to the patent scope of the present disclosure. It should be noted that, a person of ordinary skill in the art may make various changes and improvements without departing from the ideas of this application, which shall all fall within the protection scope of this application. Therefore, the protection scope of the patent of the present disclosure shall be subject to the claims.

It is noted that the various modules, submodules, units, subunits, and components in the present disclosure can be implemented using any suitable technology. For example, a module or a unit can be implemented using processing circuitry. In an example, a module or a unit can be implemented using one or more integrated circuits (IC). In another example, a module or a unit can be implemented as one or more processors executing software instructions. In another example, interface circuitry is used to implement a receiving unit (or module) and/or a sending unit (or module).

What is claimed is:

1. A method for browser resource pre-puffing, comprising:
obtaining, by processing circuitry of a terminal device that browses webpages via a network, a page address list from a present webpage in a browser of the terminal device, the page address list including page addresses of webpages that are linked in the present webpage, and with respective access frequencies satisfying a preset condition;
at least one of (i) obtaining the page address list of the webpages with the access frequencies being higher than a preset value, and (ii) obtaining a preset number of most accessed webpages in the page address list;
sending, from the processing circuitry to interface circuitry, an idle waiting instruction;
generating, by the interface circuitry and in response to the idle waiting instruction, an idle notification when the network is idle;
determining, by the processing circuitry, that the network is idle;
obtaining, by the processing circuitry, a first page address from the page address list; and
performing, by the processing circuitry, a first page pre-rendering when the network is idle to download, via the interface circuitry of the terminal device and the network, first page resource of a first webpage according to the first page address, render the first webpage using the first page resource, and store the rendered first webpage in a cache.

2. The method according to claim 1, further comprising:
obtaining a second page address from the page address list; and
performing, by the processing circuitry, a second page pre-rendering when the network is idle to download, via the interface circuitry and the network, second page resource of a second webpage according to the second page address, render the second webpage using the second page resource, and store the second webpage in the cache.

3. The method according to claim 1, further comprising:
determining that the network is idle when the idle notification is received from the interface circuitry.

4. The method according to claim 3, further comprising:
obtaining the idle notification from the interface circuitry when the present webpage has been rendered in the browser.

5. The method according to claim 3, further comprising:
obtaining the idle notification from the interface circuitry after a completion of the first page pre-rendering.

6. The method according to claim 1, further comprising:
obtaining the page address list from the present webpage in the browser of the terminal device after a rendering of the present webpage in the browser is completed.

7. The method according to claim 1, further comprising:
determining whether the first webpage corresponding to the first page address exists in the cache; and
performing the first page pre-rendering when the first webpage is missed in the cache and the network is idle.

8. A terminal device, comprising:
interface circuitry configured to receive and transmit signals carrying messages between the terminal device and a network; and
processing circuitry configured to:
obtain a page address list from a present webpage in a browser of the terminal device that browses webpages via a network, the page address list including page addresses of webpages that are linked in the present webpage, and with respective access frequencies satisfying a preset condition;
at least one of (i) obtain the page address list of the webpages with the access frequencies being higher than a preset value, and (ii) obtain a preset number of most accessed webpages in the page address list;
send to the interface circuitry an idle waiting instruction;
determine that the network is idle;
obtain a first page address from the page address list; and
perform a first page pre-rendering when the network is idle to download, via the interface circuitry of the terminal device and the network, first page resource of a first webpage according to the first page address, render the first webpage using the first page resource, and store the rendered first webpage in a cache, wherein
the interface circuitry is configured to generate, in response to the idle waiting instruction, an idle notification when the network is idle.

9. The terminal device according to claim 8, wherein the processing circuitry is further configured to:
obtain a second page address from the page address list; and
perform a second page pre-rendering when the network is idle to download, via the interface circuitry and the network, second page resource of a second webpage according to the second page address, render the second webpage using the second page resource, and store the second webpage in the cache.

10. The terminal device according to claim 9, wherein the processing circuitry is further configured to:
determine that the network is idle when the idle notification is received from the interface circuitry.

11. The terminal device according to claim 10, wherein the processing circuitry is further configured to:
obtain the idle notification from the interface circuitry when the present webpage has been rendered in the browser.

12. The terminal device according to claim 10, wherein the processing circuitry is further configured to:
obtain the idle notification from the interface circuitry after a completion of the first page pre-rendering.

13. A non-transitory computer-readable storage medium storing instructions which when executed by a processor in a terminal device cause the processor to perform:
obtaining a page address list from a present webpage in a browser that browses webpages via a network, the page address list including page addresses of webpages that are linked in the present webpage, and with respective access frequencies satisfying a preset condition;
at least one of (i) obtaining the page address list of the webpages with the access frequencies being higher than a preset value, and (ii) obtaining a preset number of most accessed webpages in the page address list;

sending an idle waiting instruction to interface circuitry that is configured to generate, in response to the idle waiting instruction, an idle notification when the network is idle;

determining that the network is idle;

obtaining a first page address from the page address list; and performing a first page pre-rendering when the network is idle to:

download first page resource of a first webpage according to the first page address;

render the first webpage using the first page resource; and store the rendered first webpage in a cache.

14. The non-transitory computer-readable storage medium according to claim according to claim 12, wherein the instructions cause the processor to further perform:

obtaining a second page address from the page address list; and performing a second page pre-rendering when the network is idle to download second page resource of a second webpage according to the second page address, render the second webpage using the second page resource, and store the second webpage in the cache.

15. The non-transitory computer-readable storage medium according to claim 13, wherein the instructions cause the processor to further perform:

determining that the network is idle when the idle notification is received from the interface circuitry.

16. The non-transitory computer-readable storage medium according to claim 15, wherein the instructions cause the processor to further perform:

obtaining the idle notification when the present webpage has been rendered in the browser.

* * * * *